US012331987B2

(12) United States Patent
Ahmed et al.

(10) Patent No.: US 12,331,987 B2
(45) Date of Patent: Jun. 17, 2025

(54) FLUSH-MOUNT LIGHT ASSEMBLY FOR A REFRIGERATOR APPLIANCE

(71) Applicant: Haier US Appliance Solutions, Inc., Wilmington, DE (US)

(72) Inventors: Nurein Ibrahim Ahmed, Louisville, KY (US); Kyle Andrew Kozinski, Louisville, KY (US); Philip Nehemiah Simons, Simpsonville, KY (US); Mark Aaron Weaver, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 225 days.

(21) Appl. No.: 17/682,138

(22) Filed: Feb. 28, 2022

(65) Prior Publication Data

US 2023/0272969 A1 Aug. 31, 2023

(51) Int. Cl.

| | |
|---|---|
| ***F25D 27/00*** | (2006.01) |
| ***F21V 5/04*** | (2006.01) |
| ***F21V 17/16*** | (2006.01) |
| ***F21V 33/00*** | (2006.01) |
| ***F21W 131/305*** | (2006.01) |

(52) U.S. Cl.

CPC .............. *F25D 27/00* (2013.01); *F21V 5/045* (2013.01); *F21V 17/164* (2013.01); *F21V 33/0044* (2013.01); *F21W 2131/305* (2013.01)

(58) Field of Classification Search

CPC ........ F25D 27/00; F21V 5/045; F21V 17/164; F21V 33/0044; F21W 2131/305

See application file for complete search history.

(56) References Cited

U.S. PATENT DOCUMENTS

| | | | | |
|---|---|---|---|---|
| 1,799,304 | A | 4/1931 | Logan | |
| 3,600,570 | A | 8/1971 | Okada | |
| 5,727,870 | A | 3/1998 | Grierson | |
| 6,670,207 | B1 * | 12/2003 | Roberts | F21S 43/14 257/E33.059 |
| 8,210,724 | B2 | 7/2012 | Ying | |
| 8,459,818 | B2 | 6/2013 | Becke et al. | |
| 10,030,844 | B2 | 7/2018 | Zampini | |
| 10,203,153 | B2 | 2/2019 | Adachi et al. | |
| 2012/0106129 | A1 * | 5/2012 | Glovatsky | F25D 23/067 362/92 |
| 2016/0313052 | A1 * | 10/2016 | Eicher | G02B 6/001 |
| 2019/0338941 | A1 * | 11/2019 | Signorino | F21V 13/04 |
| 2020/0340637 | A1 * | 10/2020 | Yeo | F21S 10/00 |

FOREIGN PATENT DOCUMENTS

| | | | |
|---|---|---|---|
| DE | 102012224165 | A1 | 7/2014 |
| EP | 2014974 | A1 | 1/2009 |
| KR | 102178897 | B1 | 11/2020 |

* cited by examiner

*Primary Examiner* — Evan P Dzierzynski
*Assistant Examiner* — Jessica M Apenteng
(74) *Attorney, Agent, or Firm* — Dority & Manning, P.A.

(57) ABSTRACT

A refrigerator appliance includes a liner positioned within a cabinet, the liner having an inner liner surface that defines a chilled chamber and an aperture that passes through the liner. A light assembly is mounted to the liner and includes a light source positioned within a light housing in the insulated space between the liner and the cabinet. A lens is mounted to the light housing and is positioned within the aperture, the lens defining an outer lens surface that sits flush with the inner liner surface and an inner lens surface defining a plurality of refractive grooves.

15 Claims, 6 Drawing Sheets

FLUSH-MOUNT LIGHT ASSEMBLY FOR A REFRIGERATOR APPLIANCE

FIELD OF THE INVENTION

The present subject matter relates generally to refrigerator appliances, and more particularly to lighting systems for improved illumination within a refrigerator appliance.

BACKGROUND OF THE INVENTION

Refrigerator appliances generally include a cabinet that defines a chilled chamber for receipt of food articles for storage. In addition, refrigerator appliances include one or more doors rotatably hinged to the cabinet to permit selective access to food items stored in chilled chamber(s). The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

Notably, in order to improve visibility within the chilled chambers, conventional refrigerator appliances include one or more lights positioned within the cabinet for illuminating the chilled chambers when the door is opened. For example, these lights may be positioned along the sides and top of the liner and are commonly positioned towards a front of the chilled chamber to better illuminate items at the front of shelves and storage bins which are immediately visible to consumers. However, conventional lights and their positioning frequently fail to provide uniform light, generate excessive glare, or otherwise generate an erratic and unpleasant illumination of the chilled chambers. Moreover, these lights are typically mounted to the liner such that they protrude into the chilled chamber, thereby occupying useful interior space and acting as obstacles for shelf movement, food item placement, etc.

Accordingly, a refrigerator appliance with an improved illumination system would be useful. More particularly, a light assembly for a refrigerator appliance that provides bright, uniform illuminance of an entire chilled chamber while occupying very little space would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a refrigerator appliance is provided including a cabinet, a liner positioned within the cabinet, the liner having an inner liner surface that defines a chilled chamber and an aperture that passes through the liner, a door being rotatably hinged to the cabinet to provide selective access to the chilled chamber, and a light assembly mounted to the liner. The light assembly includes a light source mounted between the liner and the cabinet adjacent the aperture and a lens positioned within the aperture, the lens defining an outer lens surface that sits flush with the inner liner surface and an inner lens surface defining a plurality of refractive grooves.

In another exemplary embodiment, a light assembly for a refrigerator appliance is provided. The refrigerator appliance includes a cabinet and a liner positioned within the cabinet, the liner having an inner liner surface that defines a chilled chamber and an aperture that passes through the liner. The light assembly includes a light source mounted between the liner and the cabinet adjacent the aperture and a lens positioned within the aperture, the lens defining an outer lens surface that sits flush with the inner liner surface and an inner lens surface defining a plurality of refractive grooves.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
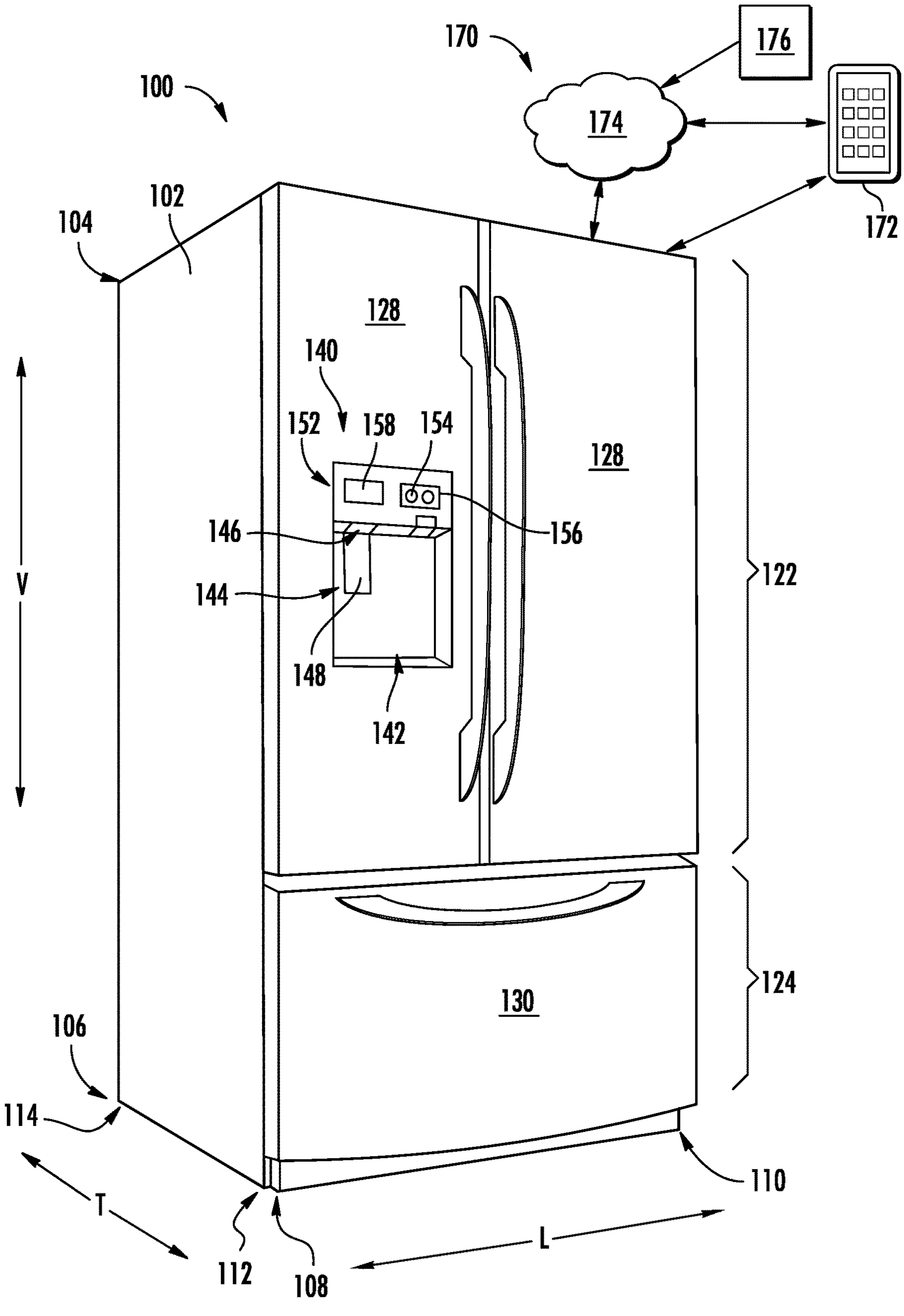
FIG. 1 provides a perspective view of a refrigerator appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
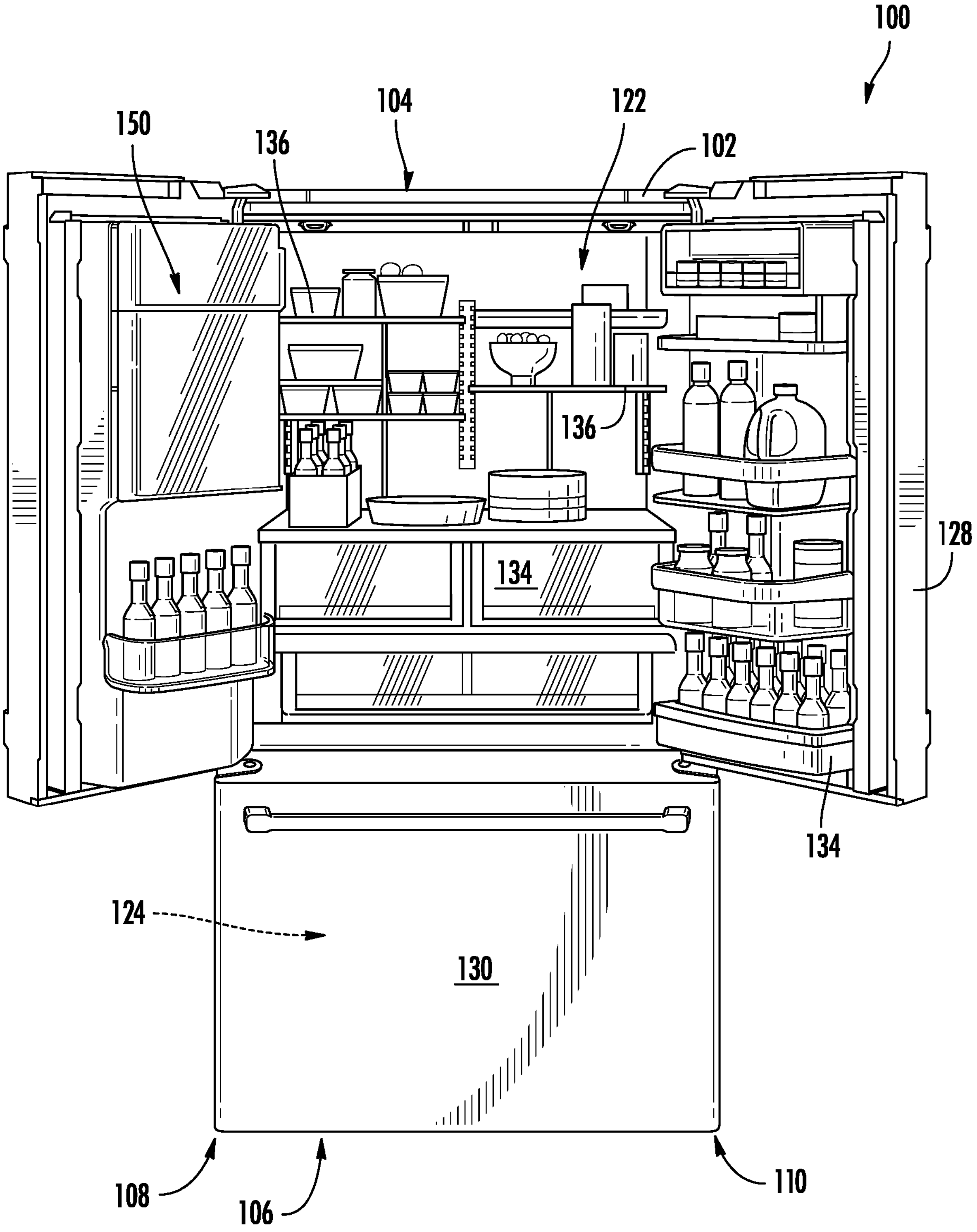
FIG. 2 provides a perspective view of the exemplary refrigerator appliance of FIG. 1, with the doors of the fresh food chamber shown in an open position according to an exemplary embodiment of the present subject matter.
Figure 3:
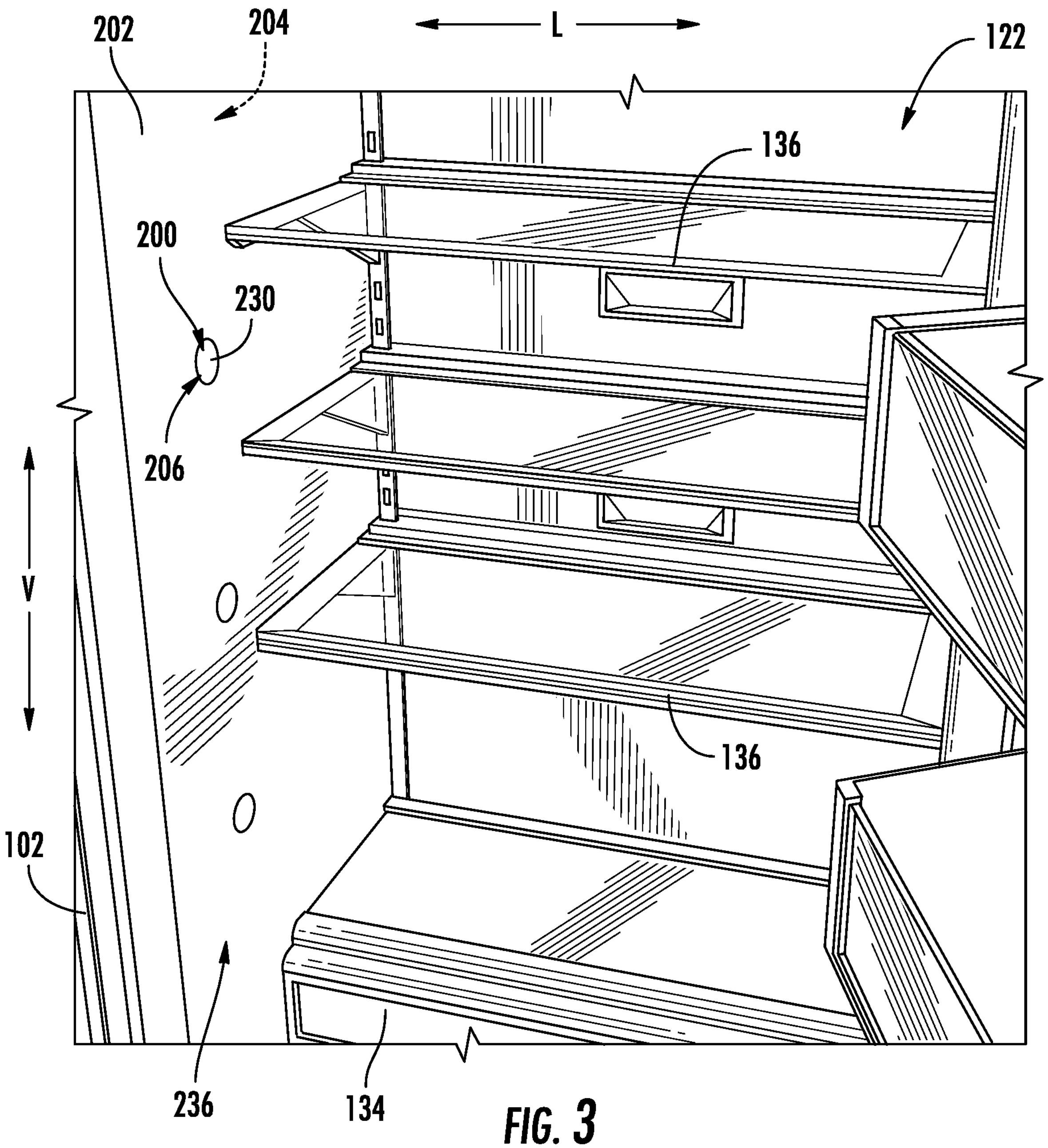
FIG. 3 provides a perspective view of the fresh food chamber and a light assembly of the exemplary refrigerator appliance of FIG. 1 according to an exemplary embodiment of the present subject matter.
Figure 4:
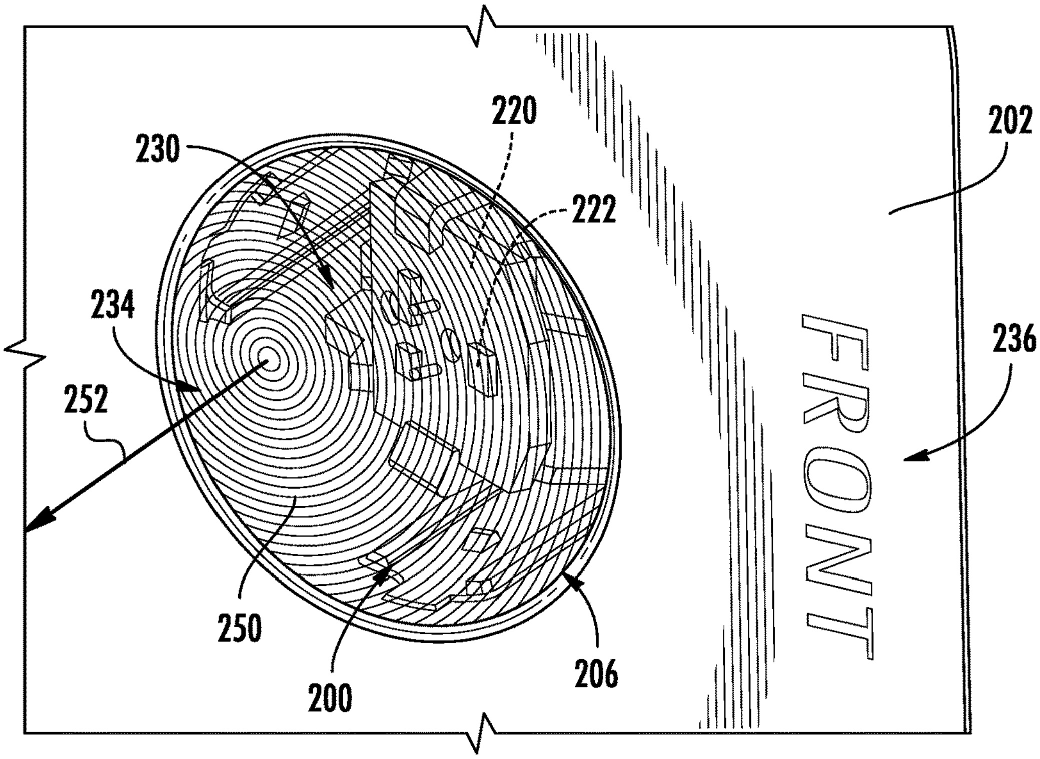
FIG. 4 provides a perspective view of the exemplary light assembly of FIG. 3 according to an exemplary embodiment of the present subject matter.

Referring now to the figures, an exemplary appliance will be described in accordance with exemplary aspects of the present subject matter. Specifically, FIG. 1 provides a perspective view of an exemplary refrigerator appliance 100 and FIG. 2 illustrates refrigerator appliance 100 with some of the doors in the open position. As illustrated, refrigerator appliance 100 generally defines a vertical direction V, a lateral direction L, and a transverse direction T, each of which is mutually perpendicular, such that an orthogonal coordinate system is generally defined.

According to exemplary embodiments, refrigerator appliance 100 includes a cabinet 102 that is generally configured for containing and/or supporting various components of refrigerator appliance 100 and which may also define one or more internal chambers or compartments of refrigerator appliance 100. In this regard, as used herein, the terms "cabinet," "housing," and the like are generally intended to refer to an outer frame or support structure for refrigerator appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of refrigerator appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing appliance 102.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applied to other appliances as well. Consequently, the description set forth herein is for illustrative purposes only and is not intended to be limiting in any aspect to any particular appliance or configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. In general, refrigerator doors 128 form a seal over a front opening 132 defined by cabinet 102 (e.g., extending within a plane defined by the vertical direction V and the lateral direction L). In this regard, a user may place items within fresh food chamber 122 through front opening 132 when refrigerator doors 128 are open and may then close refrigerator doors 128 to facilitate climate control. Refrigerator doors 128 and freezer door 130 are shown in the closed configuration in FIG. 1. One skilled in the art will appreciate that other chamber and door configurations are possible and within the scope of the present invention.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring again to FIG. 1, a dispensing assembly 140 will be described according to exemplary embodiments of the present subject matter. Although several different exemplary embodiments of dispensing assembly 140 will be illustrated and described, similar reference numerals may be used to refer to similar components and features. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142. By contrast, refrigerator door 128 may define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touchscreen interfaces, etc., such as a water dispensing button and an ice-dispensing button, for selecting a desired mode of operation such as crushed or non-crushed ice. In addition, inputs 154 may be used to specify a fill volume or method of operating dispensing assembly 140. In this regard, inputs 154 may be in communication with a processing device or controller 156. Signals generated in controller 156 operate refrigerator appliance 100 and dispensing assembly 140 in response to selector inputs 154. Additionally, a display 158, such as an indicator light or a screen, may be provided on control panel 152. Display 158 may be in communication with controller 156, and may display information in response to signals from controller 156.

As used herein, "processing device" or "controller" may refer to one or more microprocessors or semiconductor devices and is not restricted necessarily to a single element. The processing device can be programmed to operate refrigerator appliance 100, dispensing assembly 140 and other components of refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible by a processing device, including instructions that can be executed by processing device. Optionally, the instructions can be software or any set of instructions and/or data that when executed by the processing device, cause the processing device to perform operations.

Referring still to FIG. 1, a schematic diagram of an external communication system 170 will be described according to an exemplary embodiment of the present subject matter. In general, external communication system 170 is configured for permitting interaction, data transfer, and other communications between refrigerator appliance 100 and one or more external devices. For example, this communication may be used to provide and receive operating parameters, user instructions or notifications, performance characteristics, user preferences, or any other suitable information for improved performance of refrigerator appliance 100. In addition, it should be appreciated that external communication system 170 may be used to transfer data or other information to improve performance of one or more external devices or appliances and/or improve user interaction with such devices.

For example, external communication system 170 permits controller 156 of refrigerator appliance 100 to communicate with a separate device external to refrigerator appliance 100, referred to generally herein as an external device 172. As described in more detail below, these communications may be facilitated using a wired or wireless connection, such as via a network 174. In general, external device 172 may be any suitable device separate from refrigerator appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with refrigerator appliance 100 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control refrigerator appliance 100, etc. In addition, external device 172 and remote server 176 may communicate with refrigerator appliance 100 to communicate similar information.

In general, communication between refrigerator appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with refrigerator appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Referring now generally to FIGS. 3 through 9, a light assembly 200 that may be used to illuminate fresh food chamber 122, freezer chamber 124, or other regions within refrigerator appliance 100 will be described according to exemplary embodiments the present subject matter. More specifically, according to the illustrated embodiment, refrigerator appliance 100 includes a plurality of light assemblies 200 that are mounted to the sidewalls of the liner 202 and that are spaced apart along the vertical direction V. Although an exemplary light assembly 200 is described below, it should be appreciated that the number, size, position, and configuration of light assemblies 200 may vary while remaining within the scope of the present subject matter.

As explained above, refrigerator appliance 100 includes cabinet 102, which may be an outer shell or housing that is configured for containing and/or supporting various components of refrigerator appliance 100 and which may also define one or more internal chambers or compartments of refrigerator appliance 100. Liner 202 may be positioned inside of cabinet 102 and may be spaced apart from cabinet 102 to define an insulation gap 204 there between. This insulation gap 204 may be injected with an insulating foam or another insulating material to help insulate the various chilled chambers of refrigerator appliance 100. Liner 202 may be constructed from any suitable material and in any suitable manner. For example, liner 202 may be compression molded, e.g., using sheet molding compound (SMC) thermoset plastic or other thermoplastics. According to still other embodiments, portions of dispensing assembly 200 may be formed from any other suitable rigid material.

In order to illuminate the chambers of refrigerator appliance, such as fresh food chamber 122, liner 202 may define a plurality of apertures 206 configured for receiving light assemblies 200. Notably, as explained briefly above, conventional light assemblies that are mounted to liners of refrigerator appliances have various drawbacks. For example, conventional light assemblies direct too much light toward the front of fresh food chamber 122, e.g., toward a user of the refrigerator appliance. In addition, conventional light assemblies suffer from insufficient illumination intensity and distribution. In order to direct more light towards the rear of the chilled chamber, these conventional light assemblies protrude into the cavity, thereby taking up useful space and obstructing shelf positioning, user visibility, etc. Light assemblies 200 as described herein are designed to solve some or all of the issues related to conventional light assemblies.

Figure 5:
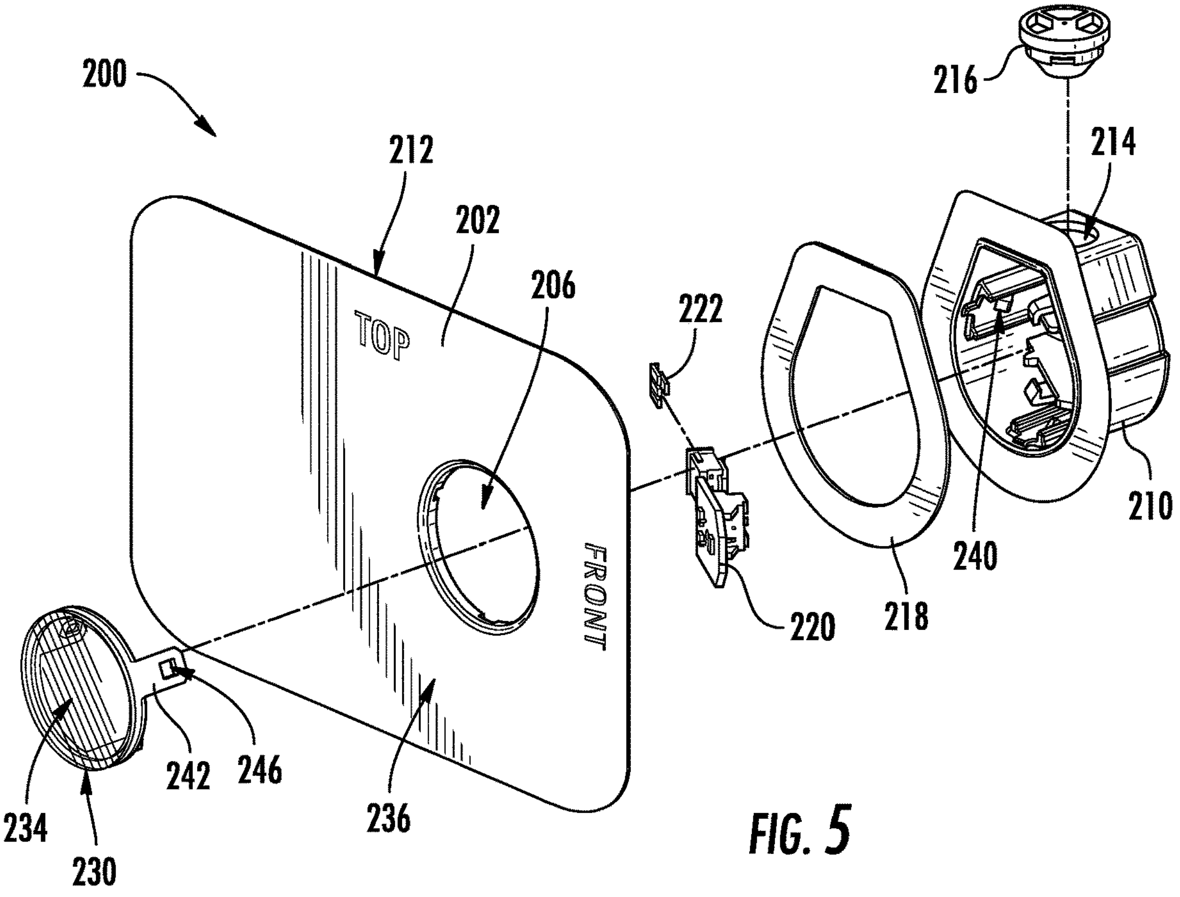
FIG. 5 provides an exploded, perspective view of the exemplary light assembly of FIG. 3 according to an exemplary embodiment of the present subject matter.

As best shown in FIG. 5, light assembly 200 may generally include a light housing 210 that is positioned within insulation gap 204 and is mounted to an outer liner surface 212. Light housing 210 is generally configured for supporting various components of light assembly 200 and may include a hole 214 through which electrical power may be supplied, e.g., via an electrical cable or wiring harness (not shown) that is secured and supported by a harness grommet 216. Light housing 210 may be formed from any suitable material and may be mounted within insulation gap 204 in any suitable manner. For example, light housing 210 may be secured to outer liner surface 212 using an adhesive gasket 218. In addition, or alternatively, light housing 210 may be foamed in place by the insulating foam that fills insulation gap 204.

Light assembly 200 may further include a control board 220 that is positioned within light housing 210 and is configured for supporting a light source 222. According to exemplary embodiments, when light housing 210 is mounted within refrigerator appliance 100, all components of light assembly, e.g., including control board 220 and light source 222 may be positioned entirely behind liner 202 relative to the chilled chamber (e.g., fresh food chamber 122). In general, control board 220 may operably couple light source 222 to any suitable controller for regulating light operation, such as controller 156 of refrigerator appliance.

Light source 222 may include any suitable number, type, position, and configuration of electrical light source(s), using any suitable light technology and illuminating in any suitable color. For example, according to the illustrated embodiment, light source 222 includes a light emitting diode (LEDs), which may illuminate in a single color (e.g., white LEDs), or which may illuminate in multiple colors (e.g., multi-color or RGB LEDs) depending on the control signal from controller 156. However, it should be appreciated that according to alternative embodiments, light source 222 may include any other suitable traditional light bulbs or sources, such as halogen bulbs, fluorescent bulbs, incandescent bulbs, glow bars, a fiber light source, etc.

Light assembly 200 may further include a lens 230 which is positioned within aperture 206 of liner 202 and is generally configured for refracting or otherwise directing light (e.g., as identified generally by reference numeral 232 in FIG. 8) within fresh food chamber 122. In addition, lens 230 may be configured for facilitating a flush mount installation of light assembly 200, e.g., for improved aesthetic appearance, easier to clean surfaces, less obstructions, etc. More specifically, lens 230 may define an outer lens surface 234 that sits flush or coplanar with an inner liner surface 236.

Light housing 210 and lens 230 may include features for securing lens 230 in the flush mount position. For example, according to the illustrated embodiment, light housing 210 may define one or more mounting sleeves or slots 240. In addition, lens 230 may define one or more complementary connecting arms 242 that extend away from an inner lens surface 244, e.g., into insulation gap 204 or into light housing 210. To install lens 230, connecting arms 242 may slide into slots 240 and may be secured by one or more snap features 246 that are defined proximate a distal end of each connecting arm 242. It should be appreciated that any other suitable mechanical engagement between light housing 210 and lens 230 are possible and within the scope present subject matter.

Notably, whereas conventional light sources for refrigerator appliances protrude slightly into the chilled chamber for improved cavity illumination, light sources 222 as described herein are positioned entirely behind liner 202. Accordingly, lens 230 may be designed to improve the refraction and redirecting of light 232 such that fresh food chamber 122 may be better illuminated with more uniform light distribution and such that less light 232 is directed toward the user proximate front side 112 of refrigerator appliance 100.

Figure 6:
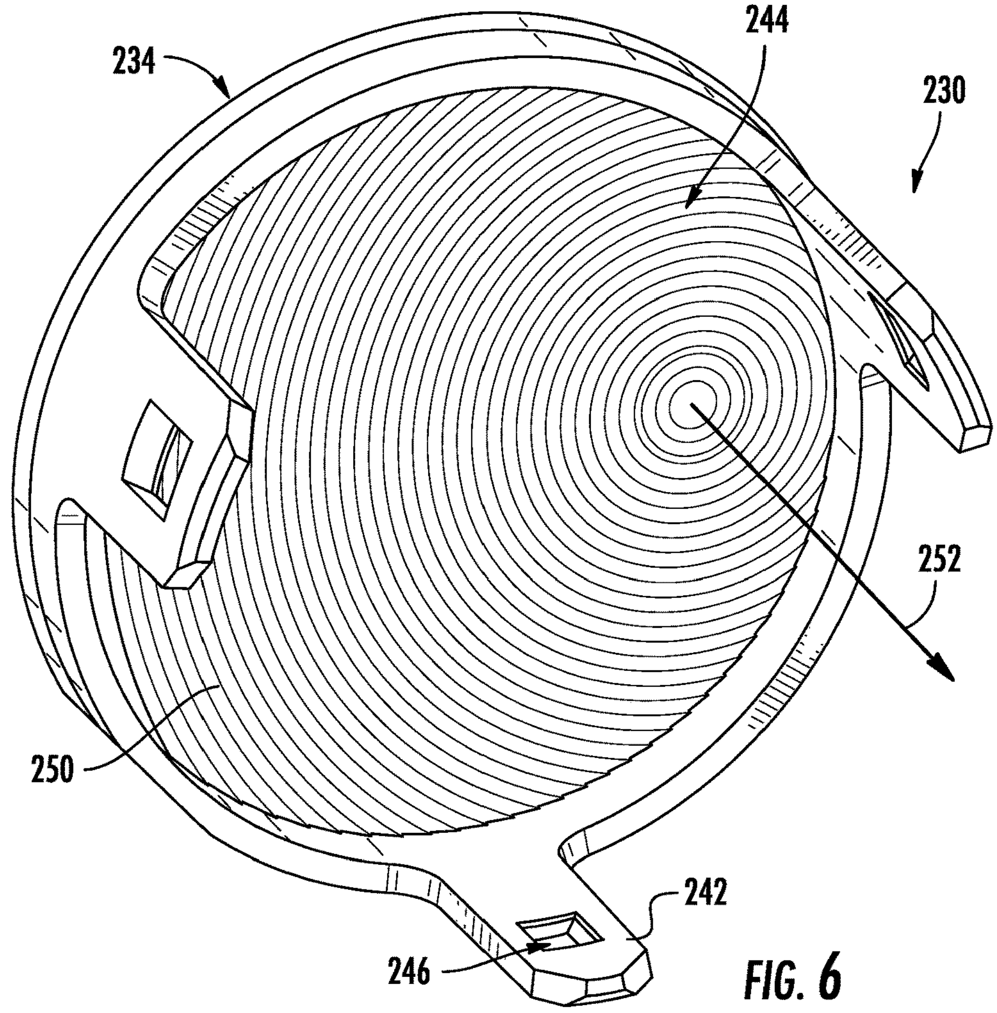
FIG. 6 provides a perspective view of a lens of the exemplary light assembly of FIG. 3 according to an exemplary embodiment of the present subject matter.
Figure 7:
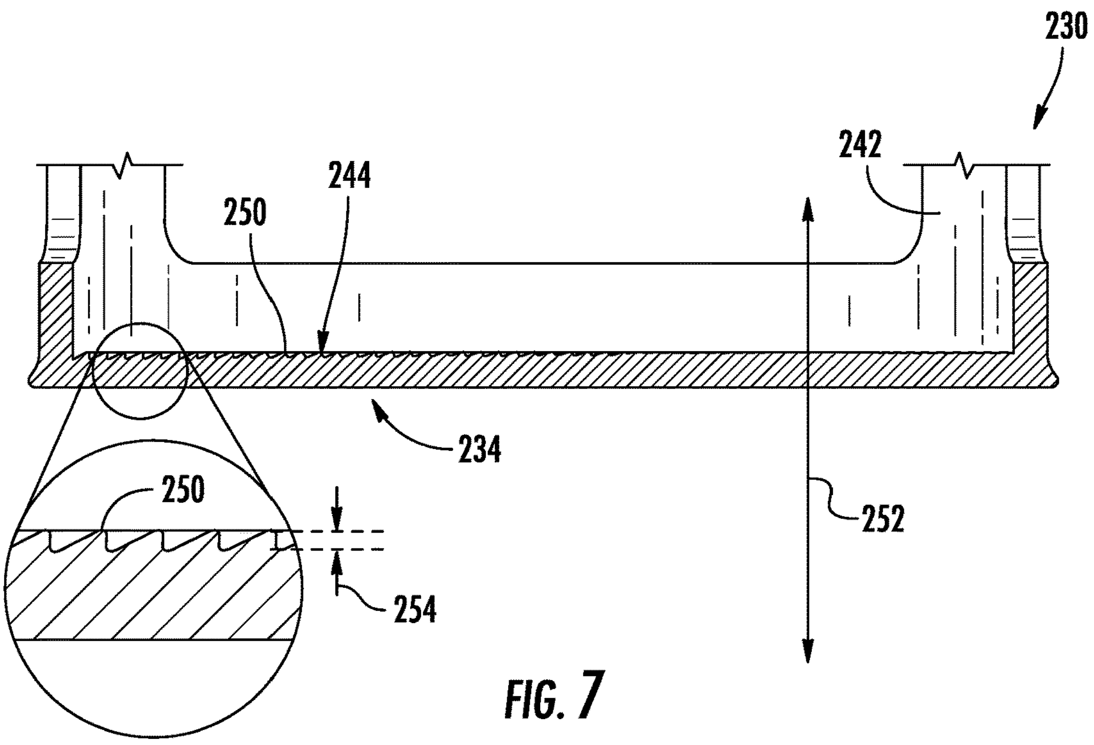
FIG. 7 provides a side, cross-sectional view of the exemplary lens of FIG. 6 according to an exemplary embodiment of the present subject matter.
Figure 8:
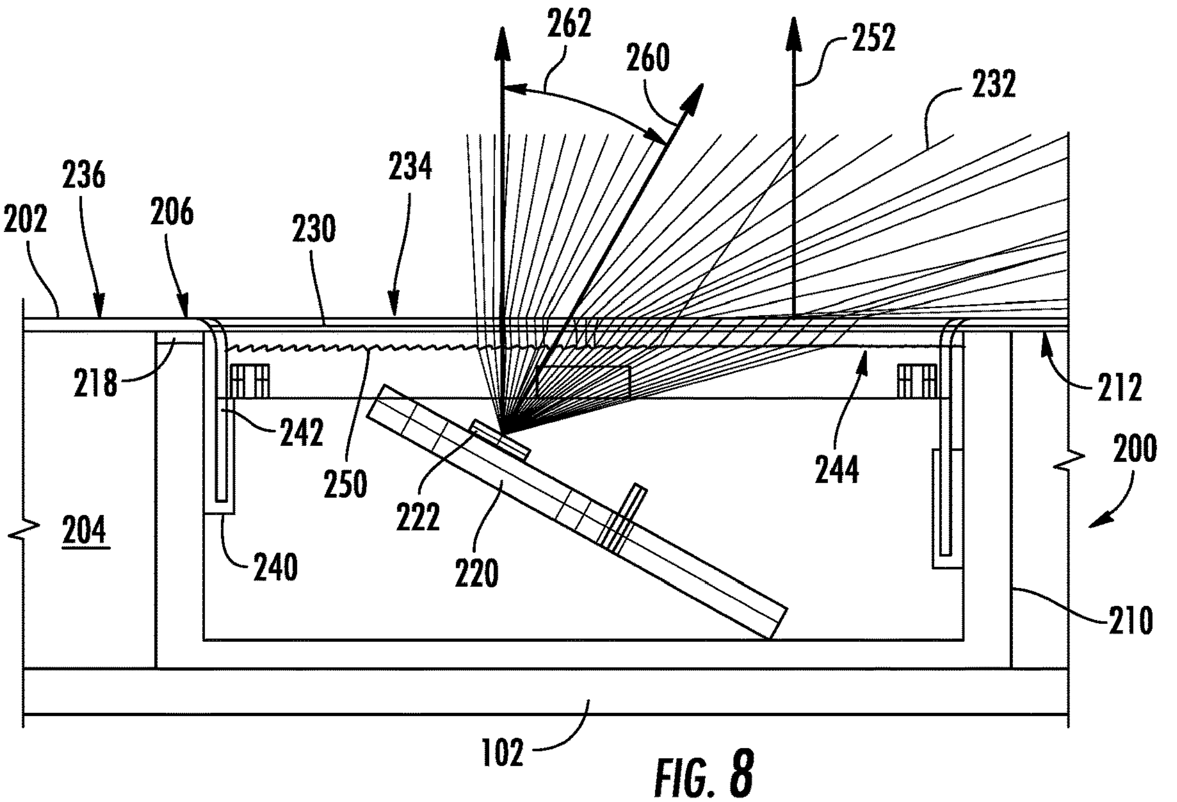
FIG. 8 illustrates the light distribution that may be achieved within the fresh food chamber of the exemplary refrigerator appliance using the exemplary light assembly of FIG. 3 according to an exemplary embodiment of the present subject matter.
Figure 9:
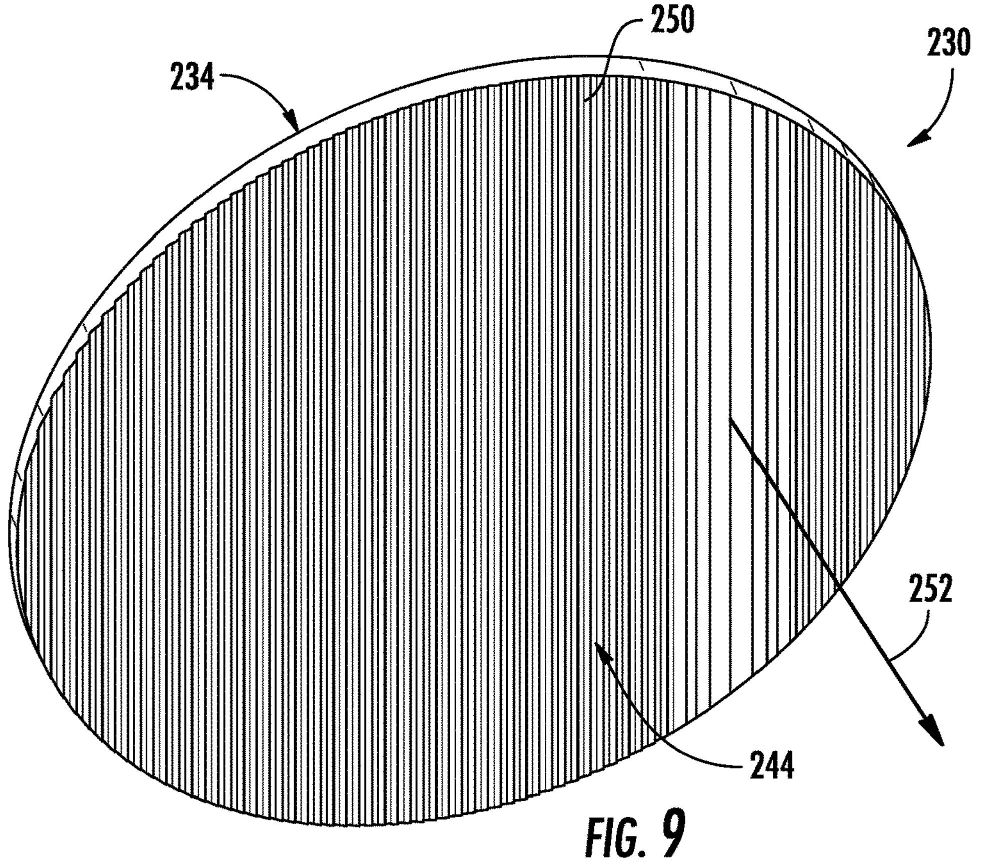
FIG. 9 provides a perspective view of a lens of the exemplary light assembly of FIG. 3 according to an alternative exemplary embodiment of the present subject matter.

Specifically, as best illustrated in FIGS. 6 through 8, inner lens surface 244 may define a plurality of refractive grooves 250. As used herein, the terms "refractive grooves" and the like are generally intended to refer to any contours, geometries, shapes, or patterns that are defined on inner lens surface 244 to improve the light distribution, uniformity, etc. For example, according to exemplary embodiments of the present subject matter, the refractive grooves 250 are Fresnel grooves. As shown for example in FIG. 6, refractive grooves 250 may be concentric about a focal axis 252 of lens 230. In addition, each of the plurality of refractive grooves 250 may define a groove depth 254 which is measured in a direction normal to inner lens surface 244. According to exemplary embodiments, and as best illustrated in FIG. 7, the groove depth 254 of refractive grooves 250 may get smaller toward focal axis 252 of lens 230, e.g., for improved light distribution. However, according to alternative embodiments such as illustrated in FIG. 9, refractive grooves 250 may instead be linear or have any other suitable profile.

In general, light sources generate symmetrical illumination about the light source. However, lens 230 may generally be designed and configured to generate an asymmetric light output that is distributed within fresh food chamber 122. In this manner, lens 230 may direct more light toward the back of fresh food chamber 122 and less light toward a user of the appliance or toward the opening proximate the front of cabinet 102. This may be achieved through a combination of the design of refractive grooves 250 along with the relative positioning and orientation of lens 230, light source 222, and the focal axes and directional orientations of each.

For example, according to the illustrated embodiment, lens 230 defines focal axis 252 at a position of off-center relative to a center of outer lens surface 234. In this regard, for example, focal axis 252 may be positioned proximate and outer radial end of lens 230, e.g., at 50%, 60%, 70%, 80%, or greater of the radial distance between a center of lens 230 and an outer radial edge of lens 230. In addition, focal axis 252 may be oriented normal to lens 230 e.g., normal to outer lens surface 234. In addition, as best shown in FIG. 8, light source 222 may be offset relative to focal axis 252 of lens 230 and/or relative to a center of lens 230 (e.g., when looking in a direction parallel to focal axis 252).

Light source 222 may also be directed or oriented such that it defines a primary illumination axis 260. In this regard, the illumination axis 260 may be the primary lighting direction or orientation of light source 222, e.g., a direction normal to the surface of light source 222 or along a center of a symmetric distribution of light 232. According to the illustrated embodiment illumination axis 260 extends at an angle 262 measured relative to a direction normal to inner lens surface 244 (e.g., or a direction parallel to focal axis 252). According to exemplary embodiments, angle 262 may be between about 5° and 60°, between about 15° and 45°, or about 30°. In addition, angle 262 may be selected for better light distribution through lens 230 and for directing light toward the back of fresh food chamber 122. Other variations and modifications to light assembly 200 are possible and within the scope of the present subject matter.

As explained above, aspects of the present subject matter are directed to a luminaire or lighting assembly for a refrigerator that has at least two distinct characteristics. For example, the first characteristic is that the output surface of the luminaire is flush with the side walls of the refrigerator cavity, thereby providing a clean, modern appearance and improving cleanability of the cavity. In addition, the second characteristic is that the luminaire may have a number of repeating Fresnel features on the inner surface which act to angle the light as it exits the luminaire away from the front of the cavity where the user is positioned, and instead angle the light towards the rear of the cavity to illuminate the contents of the cavity. According to exemplary embodiments, the focal axis of the lens is offset from that of the LED light source such that the angle-turning capability of the Fresnel features may be enhanced.

In general, the luminaires may include three main components, such as a housing, an LED board, and a lens with adhesive to hold it in place on the back side of the cavity liner. The housing may be a white plastic material that holds the LED board and lens in place against the cavity liner. The board may be snapped into place inside the housing and the lens may then be snapped into place to cover the LED board. Harness connections can be made via a separate opening in the housing which is sealed with a rubber grommet. The snap features in the housing used to hold the LED board may be angled such that the LED board is tilted at a 30-degree angle horizontally towards the back of the refrigerator cavity.

An exemplary embodiment uses concentric annular grooves to shape the light output and has the capability to both turn the light away from the user horizontally and condense the light output vertically to provide a spotlight effect within each shelf of the refrigerator. In addition, or alternatively, a second exemplary embodiment uses linear grooves and only turns the light in the horizontal direction. For example, this lens may not condense the light vertically and thus provides the most even illumination within the cavity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:

a cabinet;

a liner positioned within the cabinet, the liner having an inner liner surface that defines a chilled chamber and an aperture that passes through the liner;

a door being rotatably hinged to the cabinet to provide selective access to the chilled chamber; and a light assembly mounted to the liner, the light assembly comprising: a light source mounted between the liner and the cabinet adjacent the aperture; and a lens positioned within the aperture, the lens defining an outer lens surface that sits flush with the inner liner surface and an inner lens surface defining a plurality of refractive grooves;

wherein the lens defines a focal axis that extends perpendicular from the outer lens surface and the light source is offset relative to the focal axis of the lens, and wherein each of the plurality of refractive grooves defines a groove depth measured normal to the inner lens surface, wherein the groove depth of the plurality of refractive grooves gets smaller toward the focal axis of the lens.

2. The refrigerator appliance of claim 1, wherein the focal axis is off-center relative to a center of the outer lens surface.

3. The refrigerator appliance of claim 1, wherein the light source is directed along an illumination axis, the illumination axis extending at an angle relative to a direction normal to the inner lens surface, wherein the angle is between 15 degrees and 45 degrees.

4. The refrigerator appliance of claim 3, wherein the angle is about 30 degrees.

5. The refrigerator appliance of claim 1, wherein the light assembly further comprises:

a light housing that is mounted to an outer liner surface of the liner, the light housing defining one or more mounting slots, and wherein the lens defines one or more connecting arms that extend away from the inner lens surface to engage the one or more mounting slots when the lens is in an installed position.

6. The refrigerator appliance of claim 5, wherein the lens further comprises snap features defined proximate a distal end of each of the one or more connecting arms for securing the lens to the light housing.

7. The refrigerator appliance of claim 5, wherein the light housing is secured to an outer liner surface of the liner using an adhesive.

8. The refrigerator appliance of claim 1, wherein the plurality of refractive grooves are Fresnel grooves.

9. The refrigerator appliance of claim 1, wherein the plurality of refractive grooves is configured to generate an asymmetric light output through the lens.

10. The refrigerator appliance of claim 1, wherein the refrigerator appliance comprises a plurality of light assemblies mounted to sidewalls of the liner, the plurality of light assemblies being spaced apart along a vertical direction.

11. A light assembly for a refrigerator appliance, the refrigerator appliance comprising a cabinet and a liner positioned within the cabinet, the liner having an inner liner surface that defines a chilled chamber and an aperture that passes through the liner, the light assembly comprising:

a light source mounted between the liner and the cabinet adjacent the aperture; and a lens positioned within the aperture, the lens defining an outer lens surface that sits flush with the inner liner surface and an inner lens surface defining a plurality of refractive grooves;

wherein the lens defines a focal axis that extends perpendicular from the outer lens surface and the light source is offset relative to the focal axis of the lens, and wherein each of the plurality of refractive grooves defines a groove depth measured normal to the inner lens surface, wherein the groove depth of the plurality of refractive grooves gets smaller toward the focal axis of the lens.

12. The light assembly of claim 11, wherein the focal axis is off-center relative to a center of the outer lens surface.

13. The light assembly of claim 11, wherein the light source is directed along an illumination axis, the illumination axis extending at an angle relative to a direction normal to the inner lens surface, wherein the angle is between 15 degrees and 45 degrees.

14. The light assembly of claim 11, further comprising:

a light housing that is mounted to an outer liner surface of the liner, the light housing defining one or more mounting slots, and wherein the lens defines one or more connecting arms that extend away from the inner lens surface to engage the one or more mounting slots when the lens is in an installed position.

15. The light assembly of claim 11, wherein the plurality of refractive grooves are Fresnel grooves.

* * * * *